United States Patent [19]
Lennen

[11] Patent Number: 5,854,815
[45] Date of Patent: Dec. 29, 1998

[54] CODE PHASE SIGNAL MULTIPATH COMPENSATION

[75] Inventor: Gary R. Lennen, San Jose, Calif.

[73] Assignee: Trimble Navigation Limited, Sunnyvale, Calif.

[21] Appl. No.: 602,442

[22] Filed: Feb. 16, 1996

Related U.S. Application Data

[63] Continuation-in-part of Ser. No. 353,498, Dec. 9, 1994, Pat. No. 5,493,588.

[51] Int. Cl.$^6$ ............................... H04L 27/06; H04L 7/00
[52] U.S. Cl. ........................... 375/343; 375/355; 375/367
[58] Field of Search .................................... 375/343, 355, 375/367, 366, 368, 347, 267, 285, 208, 354; 342/350, 356, 357, 358, 378; 364/728.03

[56] References Cited

U.S. PATENT DOCUMENTS

| 4,203,071 | 5/1980 | Bowles et al. | 375/367 |
| 4,545,061 | 10/1985 | Hileman | 375/343 |
| 5,493,588 | 2/1996 | Lennen | 375/343 |

*Primary Examiner*—Tesfaldet Bocure
*Attorney, Agent, or Firm*—John Schipper

[57] ABSTRACT

Methods for synchronizing to a reference signal the timing of a received composite, code phase SATPS signal, which consists of a preferred, interference-free signal distorted by at least one interfering signal, to determine an undistorted timing point of the preferred signal. An idealized correlation function $A_I(t)$, formed from the product of a digital reference signal with a time-shifted reference signal, and a measured correlation signal $A_M(t)$, formed from the product of a received signal and a time-shifted reference signal, are computed. Peak amplitudes $A_M(p_M)$ and $A_I(p_I)$ are found for the respective measurable and idealized punctual code phase shifts $p_M$ and $p_I$. The correlation measurements formed on the early side (or on the late side) of the peak for the correlation function $A(t)$ are combined to form an estimate of the time delay associated with a multipath signal. Alternatively, correlation measurements formed on both the early and late sides of the peak are combined to form an estimate of the multipath time delay. Alternatively, a gradient difference is formed from two sets of correlation measurements to estimate the multipath time delay. Alternatively, correlation functions formed from in-phase and quadrature signals are used to estimate the multipath time delay. This last alternative allows code phase multipath time delay to be measured in the absence of receiver carrier phase lock. All four embodiments may be used in a fixed amplitude variable time (FAVT) mode and in a fixed time variable amplitude (FTVA) mode.

12 Claims, 6 Drawing Sheets

CODE PHASE SIGNAL MULTIPATH COMPENSATION

FIELD OF THE INVENTION

This patent application is a continuation in part of a patent application entitled "Multipath Compensation For Code Phase Signals", U.S. Ser. No. 08/353,498,filed Dec. 9, 1994 now issued as U.S. Pat. No. 5,493,588 on Feb. 20, 1996 and assigned to the assignee of this patent application. This invention concerns compensation for, and removal of, multipath code phase signals in a Satellite Positioning System.

BACKGROUND OF THE INVENTION

Code phase signals and carrier phase signals in a Satellite Positioning System (SATPS), such as GPS or GLONASS, are subject to multipath signal errors. A code phase signal for GPS has an associated wavelength of 300 meters and 30 meters for C/A code and P code, respectively, and a typical multipath-based code phase location error will be about 1–10 percent of this wavelength. Spatially separating two SATPS antennas, which is usually done in differential SATPS operations, will often subject the signals received at each of these two antennas to multipath perturbations with different amplitudes and different phases.

Code phase signals are used in SATPS applications to provide a reasonably accurate measurement of a vector separating two SATPS antennas. Random noise in a code phase signal typically produces a location error of about ±(5–100) cm with zero mean for a one-second signal time average and is produced by thermal and atmospheric fluctuations in the signal path. With multipath signals absent, thermal and atmospheric fluctuations and atmospheric and antenna phase center delays would be the limiting factors on accuracy. Multipath signal error is thus an important factor in precise determination of a vector separating two SATPS antennas.

The intensity, phase and period of the multipath signals depends upon the physical environment in which the SATPS antenna operates. An environment in which relatively large multipath signals enter the antenna will cause correspondingly large code phase multipath signal errors. The multipath phase change, produce by a multipath signal that adds to or subtracts from the direct, undistorted signal, depends upon the relative rates of motion of the antenna and reflecting surface(s), the physical nature of the reflecting surface(s) and the satellite motion, among other things.

Previous attempts to mitigate, or compensate for, the effects of multipath signals on the ability of a two-receiver system to provide a precise measure of the separation vector have involved several approaches. In a first approach, the receiving antenna pattern is altered so that signal reflections from objects located at or near ground level are reduced. This approach usually requires use of physically large, and a fortiori non-portable, antennas and offers no mitigation for multipath signals received from reflecting surfaces that are located high off the ground. A second approach is to perform signal time averaging to reduce the multipath effects, with typical averaging times of 600–900 sec to significantly reduce multipath signal errors. This approach cannot be used for dynamic determination of the separation vector with a moving antenna.

Winters, in U.S. Pat. No. 4,007,330,discloses formation in parallel of three correlation functions, using a single locally generated reference digital signal and three time-shifted replicas of a received digital signal with different time shifts. If the received signal has a nominal bit temporal length of $\Delta t(bit)$, the three time shift delays are chosen to be $\tau 1<\Delta t(bit)$, $\tau 2=\Delta t(bit)$ and $\tau 3>\Delta t(bit)$. The temporal bit length is contracted or expanded to account for expected Doppler shift of the received signal. The correlation signal with the highest value is chosen as the signal with the most likely time delay for the received signal.

A system for synchronizing a locally generated digital signal with a received signal is disclosed in U.S. Pat. No. 4,168,529, issued to Tomlinson. The system forms several correlation functions with associated time shifts equal to different integral multiples of an expected bit temporal length and determines the time shift corresponding to the correlation function with the largest value. The length of each sequence used to compute the correlation function is limited by the possible presence of Doppler shift, which is not accounted for directly in the choice of bit temporal length.

A pseudo-random number detection and tracking system using closed loop tracking is disclosed by Bowles et al in U.S. Pat. Nos. 4,203,070 and No. 4,203,071. The system uses a locally generated reference signal and a time-shifted received signal to form a non-linear response characteristic, usually a correlation function, and an associated error signal. A characteristic, such as time shift, of the correlation function is varied to minimize the error signal magnitude. Detecting the presence of an expected received signal requires a relatively large time shift range, and tracking of a received signal that is already detected requires a smaller time shift range.

Guinon et al, in U.S. Pat. No. 4,550,414, disclose an adaptive code tracker that receives a composite signal, which may include a direct signal and interfering signals, and forms correlation functions using the received signal and a plurality of time-shifted replicas of a reference signal. Each correlation signal is weighted, initially with uniform weights, and the weights are dynamically adjusted to vary and identify the time shift that produces the largest correlator function. The time shift increments can be fractions of a chip temporal width for the incoming signal.

In U.S. Pat. No. 4,608,569, Dickey et al disclose an adaptive signal processor for cancelling signal interference. A first time correlation function is performed, using a signal received by a highly directional antenna and one or more auxiliary interfering signals received by one or more adjacent omnidirectional antennas. The auxiliary signals are time-shifted and weights are computed and assigned to these signals. A sum of the weighted auxiliary signals is then subtracted from the main signal to produce a resultant signal that is freer from interference. Multiple signal arrival times are asserted to be accounted for with this approach.

Liebowitz discloses a multiplexed digital signal correlator in U.S. Pat. No. 4,660,164. A serial data stream is divided by a multiplexer into several parallel channels, in each of which a correlation function is computed using a locally generated reference digital signal and using the same time shift. The correlation function signals formed in the channels are combined to form an overall correlation function. The required signal processing rate for each parallel channel is less than the signal processing rate that would be required using a single channel.

A phase-coherent TDMA quadrature receiver for identifying arrival of a direct signal contained in a composite QPSK signal is disclosed in U.S. Pat. No. 4,829,543, issued to Borth et al. First and second correlation functions are formed, using a time synchronizing sequence and this sequence shifted by a quarter cycle, together with the received composite signal. The peak amplitudes of the two correlation functions are identified and used to determine a phase angle associated with the two correlation functions, from which a direct signal arrival time may be estimated.

McIntosh discloses logical ORing of a data signal with a selected pseudo-noise signal before transmission, using Manchester or differential encoding, in U.S. Pat. No. 4,862,478. The received signal is mixed with a first signal, related to the pseudo-noise signal, and with a time-delayed first signal and passed through a low pass filter. This approach assertedly produces received signals that are resistant to corruption by multipath signals.

U.S. Pat. No. 5,091,918, issued to Wales, discloses a signal equalizer that relies upon transmission with Gaussian Minimum Shift Keying of in-phase (I) and quadrature (Q) channel signals. A carrier wave of the received composite signal is removed, and the I and Q channel signals are analyzed to estimate the transmitted signals.

A multi-channel digital receiver for GPS signals is disclosed in U.S. Pat. No. 5,101,416, issued to Fenton. Correlation functions are formed, using the received signal and a selected pseudo-noise reference signal, and early, punctual and late correlation values are computed. The time delay spacings for the correlation values are dynamically adjusted to enhance the samplings of the received signal.

A digital equalizer system, using I and Q channel analysis of a received composite or distorted signal, is disclosed by Cai et al in U.S. Pat. No. 5,164,959. Correlation functions are formed using the received signal and a time-delayed reference signal in the I and Q channels. Using an estimated phase shift, signal energy in a dispersive channel (usually Q) is largely converted to signal energy in a non-dispersive channel before further analysis of the received composite signal.

Scott et al disclose a technique for correcting errors in sampling time and carrier frequency of a digital signal transmitted through a dispersive medium, in U.S. Pat. No. 5,282,228. First and second complex correlation functions are formed using the received composite signal, with phase components that provide estimates of the timing error and the carrier frequency error. These error estimates are used to adjust the complex phase and timing of subsequent received signals before the correlation functions are formed, to enhance the sampling of these signals.

A multipath noise reduction system for spread spectrum signals is disclosed by Meehan in U.S. Pat. No. 5,347,536. Early, prompt and late correlation values are computed for a correlation function formed using a time-shifted reference signal and the received signal, which may contain one or more multipath signals. In one embodiment, two early correlation values, computed at spaced apart time shift values, $\tau=t_{E1}$ and $\tau=t_{E2}>t_{E1}$, and a prompt correlation value at a time shift value $\tau=t_P$ are determined, and the multipath distortion is assumed to have the greatest effect at $\tau=t_P$ and the least effect at $\tau=t_{E1}$. A slope of error signals is computed, using the correlation values at the time shift values $\tau=t_{E1}$, $t_{E2}$, and this slope value is used to estimate the multipath-induced error at the prompt time shift value $\tau=t_P$.

These approaches do not determine multipath signal perturbations to a "clean" signal and do not provide real time capability for initially identifying and assisting lock-on to, or for re-locking to, a given SATPS satellite. What is needed is an approach that allows code phase multipath signal errors to be determined quickly and quantitatively, in a time interval of length considerably less than one sec, that maintains portability of the SATPS ground equipment, and that is flexible enough to adapt to whatever is the present situation.

SUMMARY OF THE INVENTION

The need to eliminate or suppress the code phase multipath signals is met by the invention, which provides an analytical approach for estimation of the shift of the phase for peak amplitude of the code phase correlation function in terms of measured values the code phase correlation function at early and/or late time points on a graph of the correlation function. In an idealized environment, with no multipath present, a correlation function $A_I(t)$ can be formed from a point-by-point product of the received satellite signal and a time-shifted, receiver-generated replica of a reference signal. The voltage observed at the output terminal of a receiver correlator is given by a point on the graph of the correlation function $A_I(t)$, where t represents the time shift between the incoming signal and the locally-generated reference signal. In the presence of one or more code phase multipath signals, the incoming signal is distorted by inclusion of one or more reflected and time-delayed incoming signals, and the ideal correlation function $A_I(t)$ is replaced by a measured correlation function $A_M(t)$ with a corresponding peak amplitude $A_M(t_M)$ at a punctual value $t=p_M$ for the time shift.

In general, three types of correlation measurements are formed in an SATPS receiver: $A(p_M)$, representing a measurement at or near the peak amplitude of the measured autocorrelation function; $A(e_M)$, representing a measurement on the early side of the punctual value $(e_M<p_M)$; and $A(l_M)$, representing a measurement on the late side of the punctual value $(l_M>p_M)$ In a first embodiment of the invention, the correlation measurements formed on the early side (or on the late side) of the peak amplitude for the correlation function A(t) are combined to form an estimate of the time delay associated with a multipath signal. In a second embodiment, correlation measurements formed on both early and late sides of the peak are combined to form an estimate of the multipath time delay. In a third embodiment, a gradient difference is formed from two or more sets of correlation measurements to estimate multipath time delay. In a fourth embodiment, correlation functions formed from in-phase and quadrature signals are used to estimate the multipath time delay. This fourth embodiment allows code phase multipath time delay to be measured in the absence of receiver carrier phase lock. All four embodiments may be used in a fixed amplitude variable time (FAVT) mode and in a fixed time variable amplitude (FTVA) mode.

DESCRIPTION OF PREFERRED MODES FOR PRACTICE OF THE INVENTION

A SATPS, such as GPS or GLONASS, typically uses spread spectrum modulation of signals transmitted by two or more SATPS satellites. One advantage of use of spread spectrum modulation is that the receiver can determine the time of arrival of a signal transmitted by a given satellite. Accurate determination of the arrival time for such as satellite is crucial in determination of pseudorange from the transmitting satellite to the receiver. Pseudorange is an approximate or uncorrected measurement of the distance between transmitter and receiver.

Determining the arrival time of a known, incoming signal requires recognition of an initial portion of this signal and comparison of the time of recognition of this initial portion with the time the signal was transmitted. This determination is made by aligning the incoming signal with a reference or replica signal in a code tracking loop, using a variable time delay based on the time the incoming signal was transmitted. The code tracking loop adjusts the time delay of the reference signal relative to the incoming signal, based on some quantitative measure of signal alignment such as a measurement of the correlation between the two signals. A correlation function for two (digital) signals, as used herein, is expressed as a sum or integral of a Boolean product of values of an incoming signal and a time delayed reference signal. If an EXclusive NOR product (EXclusive OR product) is formed by the correlator, the peak value sought (corresponding to optimum time delay) is usually the maximum value (minimum value) of the correlation function. When this optimal time delay value is identified and is multiplied by the signal propagation speed, the uncorrected range or pseudorange between transmitter and receiver is obtained.

If the incoming signal and reference signal are aligned within one signal cycle time or "chip width" of each other, measurement of the correlation function will produce a measurable amount of correlation power, and this measured power should increase as optimal signal alignment is approached. An extremum in correlation power will be sensed when the incoming signal and the reference signal are optimally aligned in time. The time delay corresponding to optimal alignment is often referred to as the "punctual" code phase shift. A smaller time delay and a larger time delay, usually within one chip width of the punctual code phase shift, are referred to as "early" code phase shift and "late" code phase shift, respectively. The optimum code phase shift may vary with time. If the optimum code phase shift can be identified and maintained, optimum detection of modulation of the transmitted signal can be performed.

A measured correlation function, which may manifest the presence of multipath signals, is determined by $$A_M(t_M) = S_{comp}(t) * S_{ref}(t+t_M), \qquad (1)$$

where the asterisk (*) indicates formation of a sum or integral of a Boolean product of values of the incoming composite signal $S_{comp}(t)$ and a time-shifted reference signal $S_{ref}(t+t_M)$. An idealized correlation function, with no distortion or loss of signal definition, is similarly determined by $$A_I(t_I) = S_{ref}(t) * S_{ref}(t+t_I). \qquad (2)$$

Figure 1A:
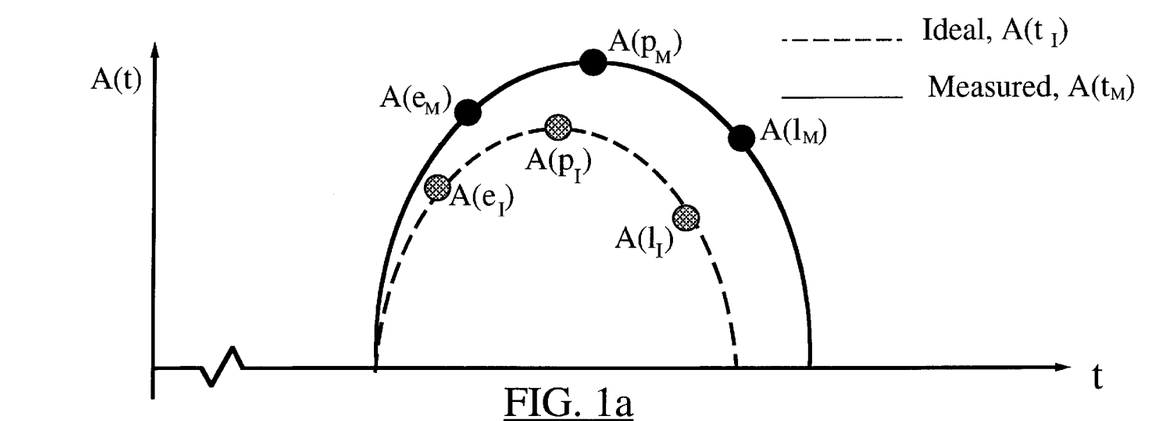
FIGS. 1A and 1B are graphical views illustrating distortion of a correlation function in the presence of a multipath signal for the FTVA mode.
Figure 1B:
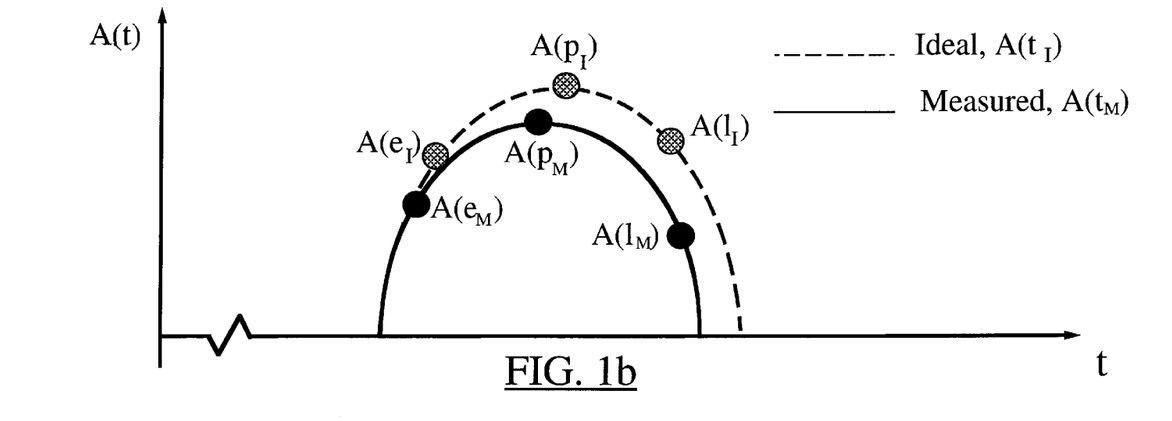
Figure 2A:
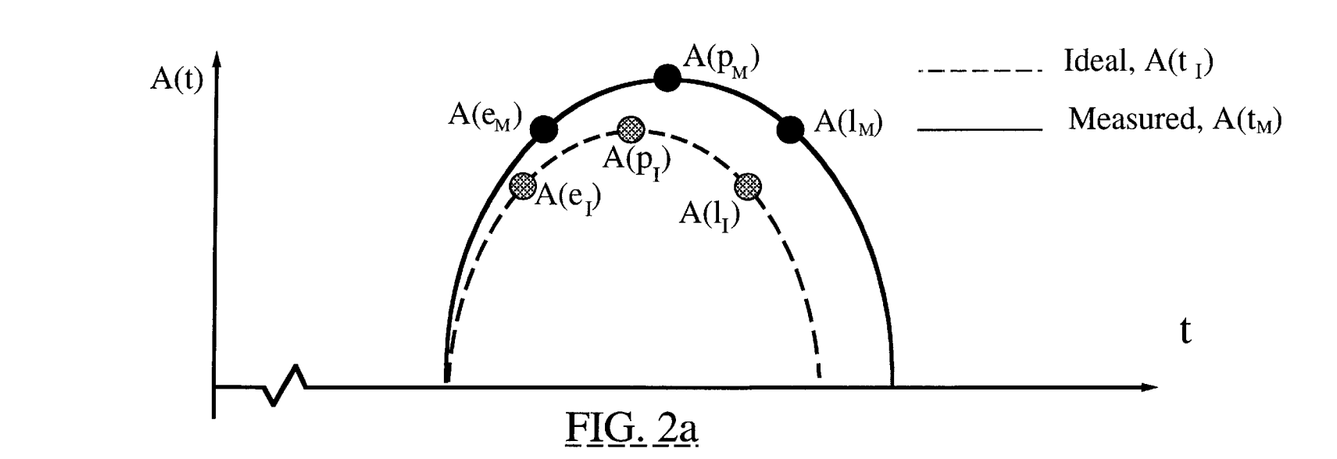
FIGS. 2A and 2B are graphical views illustrating distortion of a correlation function in the presence of a multipath signal for the FAVT mode.
Figure 2B:
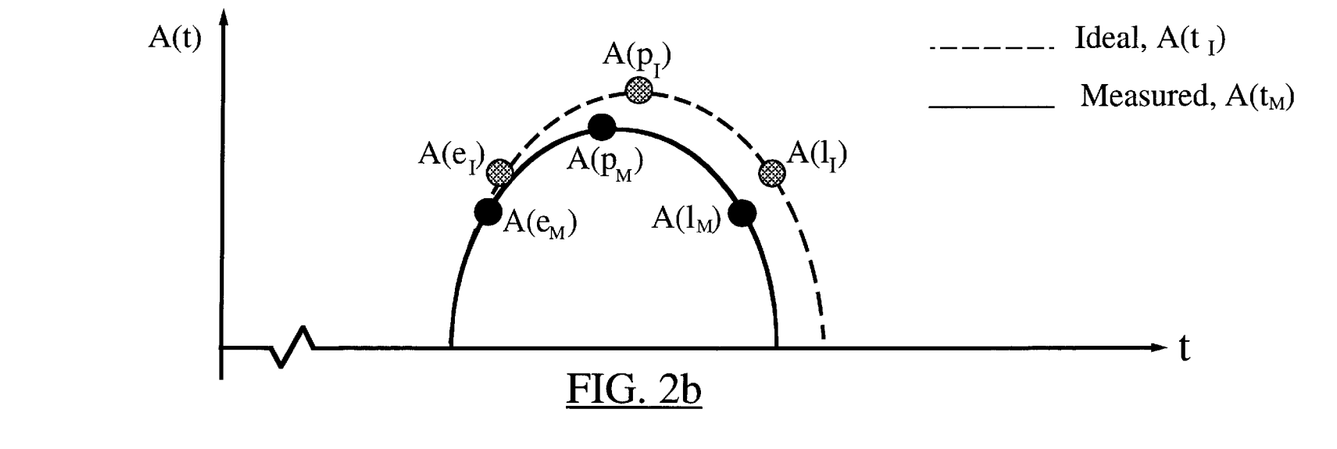

Measured and idealized correlation functions are shown graphically in FIGS. 1A and 1B for an FTVA mode and in FIGS. 2A and 2B for an FAVT mode. Representative early, punctual and late code phase shifts $e_M$, $p_M$ and $l_M$, and $e_I$, $p_I$ and $l_I$, expressed in units of time delay, for the measured and idealized correlation functions are shown in each of these figures. The punctual code phase shift $p_M$ for the measured correlation function is shifted by an as-yet-unknown time shift from the punctual code phase shift $p_I$ that would be present in the absence of multipath signals. The composite signal (including multipath) may be in phase with the direct signal that does not include multipath; in this event, the correlation function $A_M(t_M)$ will be an "expanded" version of the idealized correlation function, with increased amplitude as shown in FIGS. 1A and 2A. The composite signal (including multipath) may be approximately 180° out of phase with the direct signal that does not include multipath; in this event, the correlation function $A_M(t_M)$ will be an "contracted" version of the idealized correlation function, with decreased amplitude as shown in FIGS. 1B and 2B.

A typical code tracking loop forms at least two correlation measurements, $A_M(e_M)$, and $A_M(l_M)$, one on each side (early and late) of the punctual code phase shift $p_M$, and chooses early and late code phase shift values for which $A_M(e_M) = A_M(l_M)$. In the presence of multipath signals, the peak amplitudes $A_M(p_M)$ and $A_I(p_I)$ for the measured and idealized correlation functions are usually not equal and the punctual code phase shift values $p_M$ and $p_I$ are also not equal. The time difference $p_M - p_I$, multiplied by the signal propagation speed, represents a code phase distance error, due to the presence of multipath signals, for a given combination of transmitter and receiver.

U.S. patent application Ser. No. 07/823,980 discloses use of combined correlation function values to produce an estimate of the punctual code phase shift difference $P_M - p_I$. The correlators used in this earlier patent application can operate in the FAVT mode or in the FTVA mode. In the FTVA mode, the code phase shift difference $p_M - e_M$ or $p_M - l_M$ between correlation shifts is equal to a selected constant, and the presence of multipath signals causes the ratio of correlation amplitude $$r_{M,e} = A_M(e_M)/A_M(p_M), \qquad (3)$$

or $$r_{M,l} = A_M(l_M)/A_M(p_M), \qquad (4)$$

to vary, depending upon the characteristics of the multipath signal(s) present. This is shown in FIGS. 1A and 1B. In this mode, the punctual code phase shift difference $p_M - p_I$ can be estimated by a function $$p_M - p_I = F_e(r_{M,e} - r_{I,e}), \qquad (5)$$

or $$p_M - p_I = F_l(r_{M,l} - r_{I,l}), \qquad (6)$$

depending upon the ratio differences, where $$r_{I,e} = A_I(e_I)/A_I(p_I), \qquad (7)$$

$$r_{I,l} = A_I(l_I)/A_I(p_I). \qquad (8)$$

In the FAVT mode, the ratio of correlation amplitudes $r_{e,M} = A_M(e_M)/A_M(p_M)$ or $r_{l,M} = A_M(l_M)/A_M(p_M)$ is held constant and the punctual code phase shift difference can be estimated by a function $$p_M - p_I = G_e((p_M - e_M) - (p_I - e_I)) \qquad (9)$$

or $$p_M - p_I = G_l((p_M - l_M) - (p_I - l_I)), \qquad (10)$$

depending upon the time shift differences used.

Figure 6A:
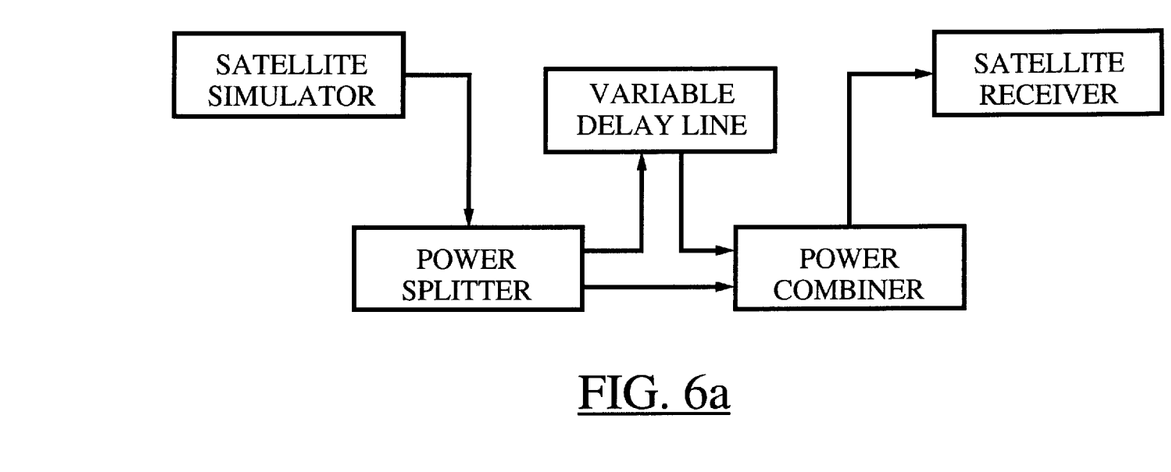
FIGS. 6A and 6B illustrate two methods of obtaining a multipath estimation polynomial or multinomial, empirically and theoretically, respectively.

The functions $F_x$ and $G_x$ (x=e or l) in Eqs. (5), (6), (9) and (10) depend upon signal filtering in the satellite transmitter and in the receiver. The approximate forms of these functions can be determined using a satellite simulator, as illustrated in FIG. 6A, measuring the code phase shift difference $p_M-p_I$ under varying multipath signal conditions and examining graphical plots of these differences.

Figure 6B:
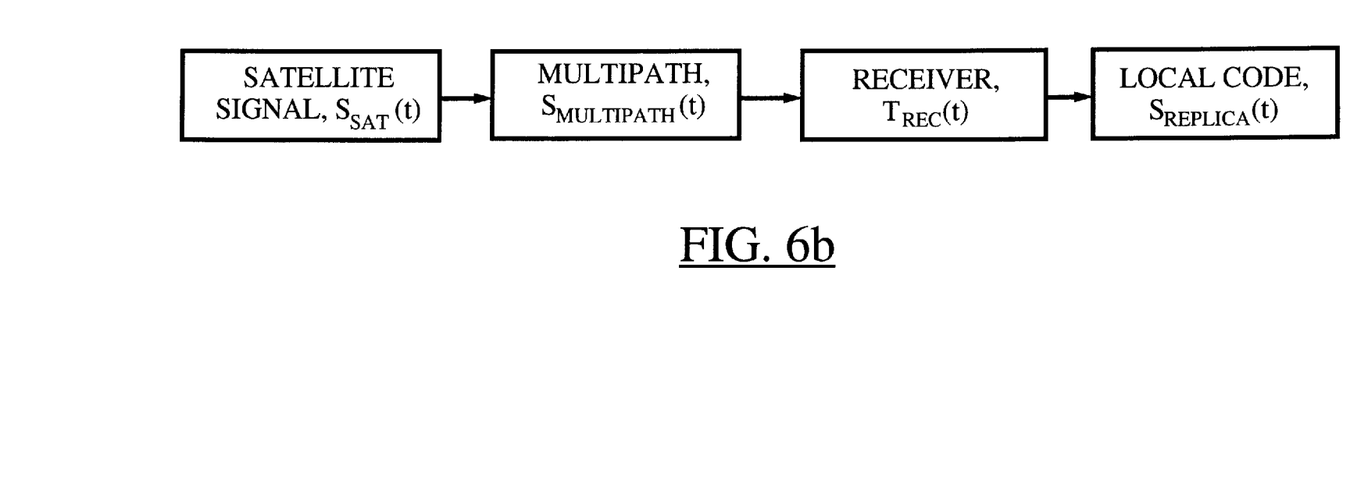

Alternatively, the functions $F_x$ and $G_x$ (x=e or l) can be estimated theoretically by combining the transfer functions representing the signal processing characteristics of the satellite signal transmitter, propagation medium, receiver and reference signal generator. This is illustrated in FIG. 6B, and the corresponding equations are set forth in Eqs. (11)–(16)

$$A(p_I)=S_{sat}(t)*1*S_{rec}(t)*S_{ref}(t+p_I), \quad (11)$$

$$A(e_I)=S_{sat}(t)*1*S_{rec}(t)*S_{ref}(t+e_I), \quad (12)$$

$$A(l_I)=S_{sat}(t)*1*S_{rec}(t)*S_{ref}(t+l_I), \quad (13)$$

$$A(p_M)=S_{sat}(t)*S_{multipath}(t)*S_{rec}(t)*S_{ref}(t+p_M), \quad (14)$$

$$A(e_M)=S_{sat}(t)*S_{multipath}(t)*S_{rec}(t)*S_{ref}(t+e_M), \quad (15)$$

$$A(l_M)=S_{sat}(t)*S_{multipath}(t)*S_{rec}(t)*S_{ref}(t+l_M), \quad (16)$$

where the transfer functions denoted by "1" and "$S_{multipath}(t)$" indicate atmospheric propagation without distortion, loss of definition or reflection and atmospheric propagation with production of one or more multipath signals, respectively.

In the FAVT mode, the amplitude ratio $r_{M,e}$ or $r_{M,l}$ (and, similarly, $r_{I,e}$ or $r_{I,l}$) is kept constant, and the code phase shift difference $p_M-e_M$ or $p_M-l_M$ varies with the multipath signal(s) present, as illustrated in FIGS. 2A and 2B; that is, $$r_{M,e}=A_M(e_M)/A_M(p_M)=k1 \text{(selected constant)}, \quad (17)$$

or $$r_{M,l}=A_M(l_M)/A_M(p_M)=k2 \text{(selected constant)}, \quad (18)$$

where k1 and/or k2 is chosen to facilitate measurement of the effects of presence of a multipath signal at different values of the code phase shift on the measured correlation function $A_M(t)$. For example, choosing k1=0.5 (or k2=0.5) will provide a measure of multipath effects at a code phase shift $e_M$ or $l_M$ that is approximately one-half the amplitude of a spectrum spreading code cycle, relative to the punctual code phase shift value $p_M$. The difference in the measured and idealized punctual code phase shifts is then estimated from the relation $$p_M-p_I=F_e((p_M-e_M)-(p_I-e_I)) \quad (19)$$

or $$p_M-p_I=F_l((p_M-l_M)-(p_I-l_I)) \quad (20)$$

where $F_e$ and $F_l$ are selected functions of the indicated variables.

Figure 3A:
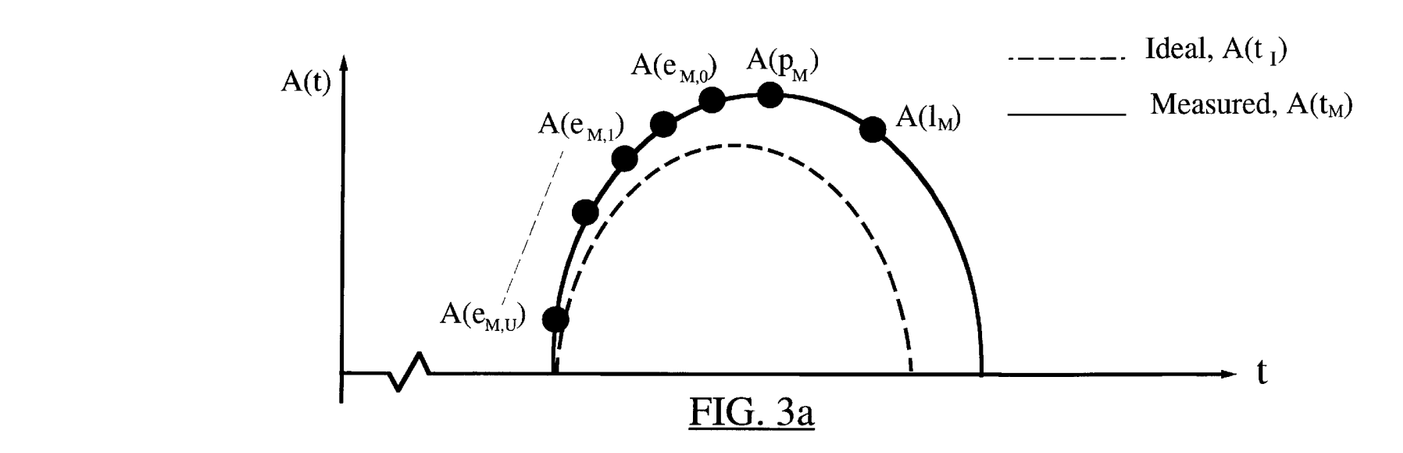
FIGS. 3A and 3B are graphical views illustrating the early and late multiple correlation embodiments, respectively.
Figure 3B:
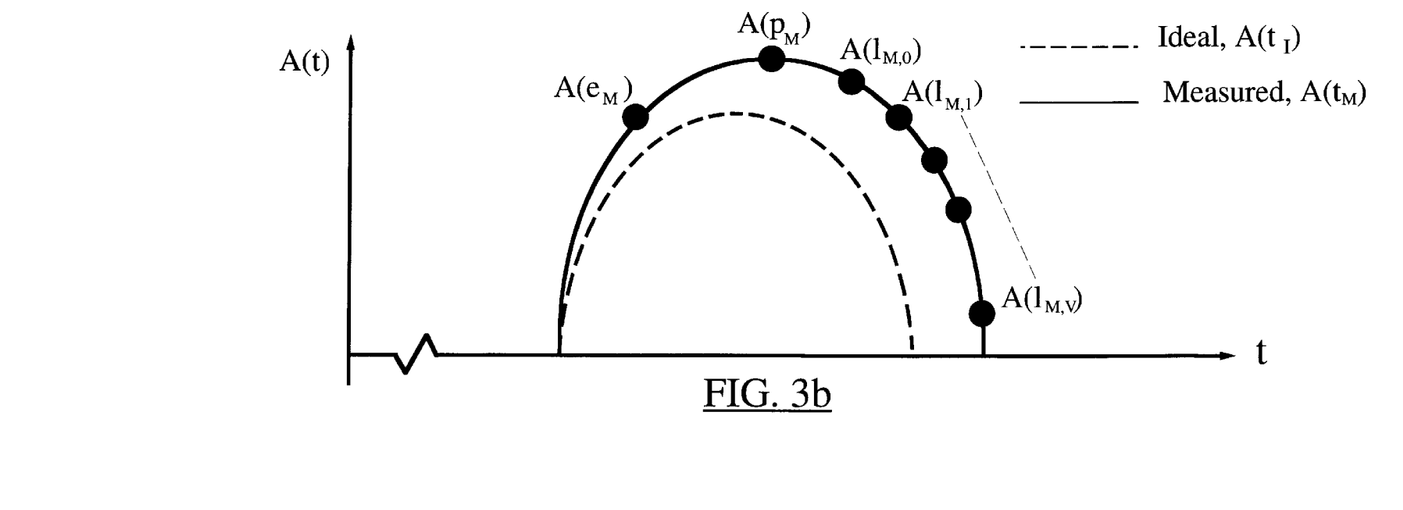
Figure 4A:
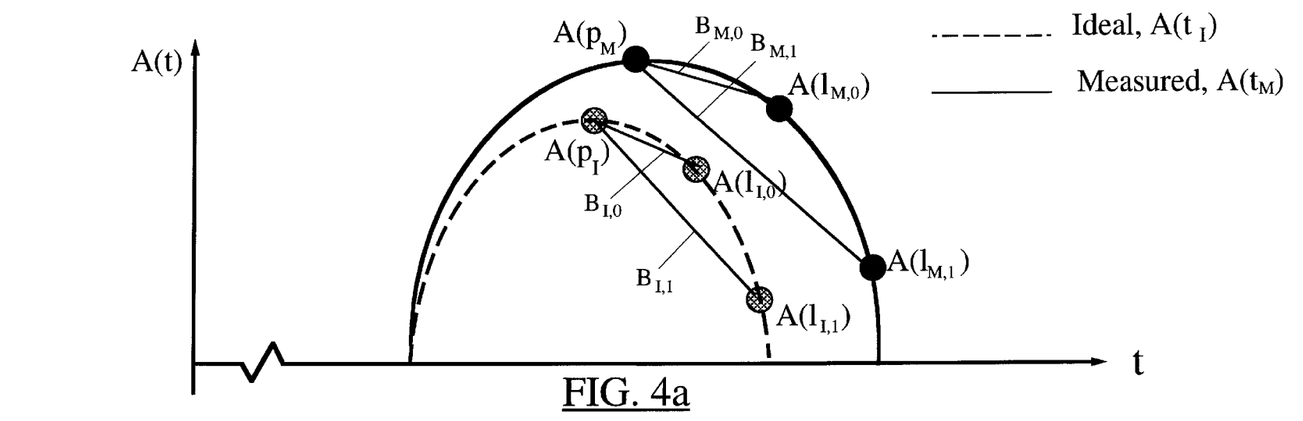
FIGS. 4A and 4B are graphical views illustrating the multiple correlation gradient measurement embodiments for early and late measurements, respectively.
Figure 4B:
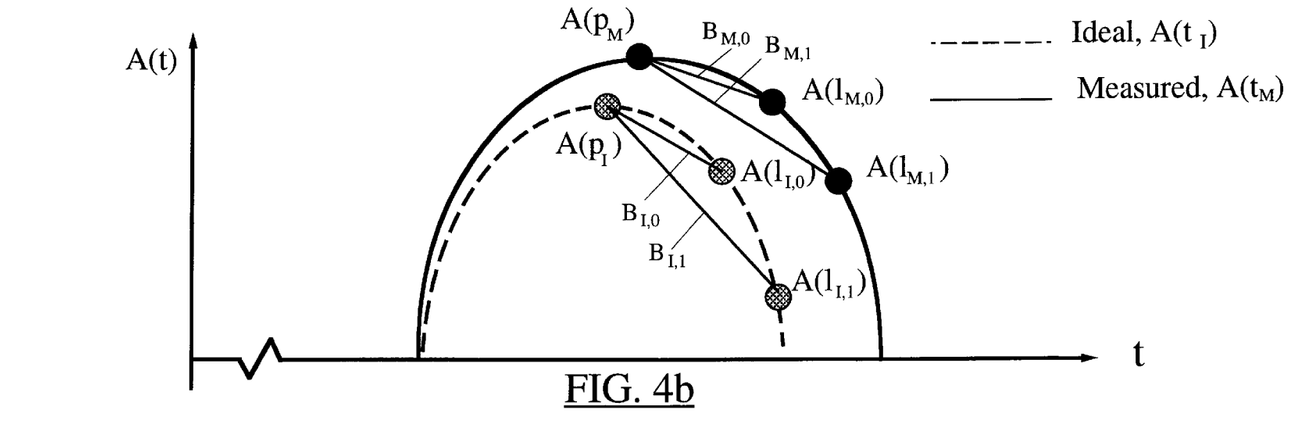

Another embodiment of the invention uses multiple correlation amplitudes and their corresponding code phase shifts, on the early side, or on the late side, or on both the early side and the late side, of the punctual phase shift value, as illustrated in FIGS. 3A and 3B. The early side and the late side of a correlation function $A_M(t)$ are subject to different levels of multipath signal interference. Multipath is always time delayed with respect to arrival time of the direct signal with no multipath interference, and hence the level of multipath signal interference will always be larger on the late side of the punctual code phase shift. Because the early side and late side of the measured correlation function $A_M(t)$ include multipath interference, either of these two sides, or both, can be used to estimate the code phase error due to multipath. Multiple correlation amplitudes $A_M(t)$ are obtained on the early side ($t=e_M<p_M$), on the late side ($t=l_M>p_M$), or on both the early and late sides of the punctual code phase shift $p_M$ In the FTVA mode, two sequences of early side code phase shift values, $\{e_{M,i}\}$ and $\{e_{I,i}\}$, are chosen that satisfy the relations $$p_M-e_{M,i}=\Delta_{M,e,i} (i=1,2,\ldots,U;U\geq 2) \quad (21)$$

$$p_I-e_{I,i}=\Delta_{I,e,i}, \quad (22)$$

where the quantities $\Delta_{M,e,i}$ and $\Delta_{I,e,i}$ are selected (positive) values. Differences of correlation amplitude ratios $$x_{e,i}=A_M(e_{M,i})/A_M(p_M)-A_I(e_{I,i})/A_I(p_I) \quad (23)$$

are formed. The unknown difference, $p_M-p_I$, in the punctual code phase shift values for the measurable and idealized correlation functions is expressed as a function $$p_M-p_I=F_e(x_{e,1},x_{e,2},\ldots,x_{e,U}) \quad (24)$$

of the ratios $x_{e,i}$, where $F_e$ is a suitable function of U variables $x_{e,1}, x_{e,2}, \ldots$ and $x_{e,U}$, with a functional form that can be found empirically or theoretically by the methods discussed above in connection with FIGS. 6A and 6B. For example, the function $F_e$ can be approximated by a multinomial in the U variables, viz., $$F_e(x_{e,1},x_{e,2},\ldots,x_{e,U})=\Sigma a_{mn\ldots p}(x_{e,1}-x_{e,1,0})^m(x_{e,2}-x_{e,2,0})^n m,n, \ldots, p \ldots (x_{e,U}-x_{e,U,0})^p,$$

where the coefficients $a_{mn\ldots p}$ are determined empirically or theoretically and the quantities $x_{e,i,0} (i=1,\ldots,U)$ are selected zero point values (e.g., $x_{e,i,0}=0$) for the approximation to the function $F_e$. The function $F_e$ can be approximated by any other suitable function, such as an algebraic, transcendental, trigonometric, hyperbolic, exponential or rational function of the U variables.

If, instead, a sequence of V late side code phase shifts for the FTVA mode is chosen, two late side sequences, $\{l_{M,i}\}$ and $\{l_{I,i}\}$, are chosen. The analogs of Eqs. (21), (22), (23) and (24) become, respectively, $$p_M-l_{M,j}=\Delta_{M,l,j} (j=1,\ldots,V;V\geq 2) \quad (25)$$

$$p_I-l_{I,j}=\Delta_{I,l,j}, \quad (26)$$

$$x_{l,j}=A_M(l_{M,j})/A_M(p_M)-A_I(l_{I,j})/A_I(p_I), \quad (27)$$

$$p_M-p_I=F_l(x_{l,1},x_{l,2},\ldots,x_{l,V}), \quad (28)$$

where $\Delta_{M,l,j}$ and $\Delta_{I,l,j}$ are selected (negative) values and $F_l$ is a suitable function of V variables.

If, instead, a sequence of U early side code phase shifts and a sequence of V late side code phase shifts for the FTVA mode are used, two early side sequences, $\{e_{M,i}\}$ and $\{e_{I,i}\}$ and two late side sequences, $\{1^{M,i}\}$ and $\{1_{I,i}\}$ are chosen that satisfy Eqs. (21), (22), (25) and (26), respectively. The analog of Eq. (24) or Eq. (28) becomes $$p_M-p_I=F(x_{e,1},x_{e,2},\ldots,x_{e,U},x_{1,1},x_{1,2},\ldots,x_{1,V}), \quad (29)$$

where F is a suitable function of U+V variables.

In the FAVT mode, two sequences of early side correlation amplitudes, $\{A_M(e_{M,i})\}$ and $\{A_I(e_{I,i})\}$, are determined ($i=1,2,\ldots,U;U\geq 2$), where the corresponding code phase shift values $e_{M,i}$ and $e_{I,i}$ are chosen so that the amplitude ratios $$r_{M,e,i}=A_M(e_{M,i})/A_M(p_M)(i=1, 2, \ldots, U) \quad (30)$$

$$r_{I,e,i}=A_I(e_{I,i})/A_I(p_I), \quad (31)$$

are equal to selected values (lying in the range $0 \leq r < 1$). Introducing the variables $$Y_{e,i}=(p_M-e_{M,e,i})-(p_I-e_{I,e,i}), \quad (32)$$

the difference $p_M-p_I$ between the punctual code phase shifts for the measured and idealized correlation functions can be expressed as a function of the U variables $Y_{e,i}$, viz.

$$p_M-p_I=G_e(y_{e,1},y_{e,2},\ldots,y_{e,U}), \quad (33)$$

where $G_e$ is a suitable and determinable function of the U variables $Y_{e,1}, Y_{e,2}, \ldots, Y_{e,U}$.

For the analogous late side correlation amplitudes in the FAVT mode, two sequences of late side correlation amplitudes, $\{A_M(l_{M,j})\}$ and $\{A_I(l_{I,j})\}$, are chosen, and the analogs of Eqs. (29), (30), (31) and (32) become, respectively, $$r_{M,l,j}=A_M(l_{M,j})/A_M(p_M)(j=1,2,\ldots,V;V \geq 2), \quad (34)$$

$$r_{I,1,j}=A_I(l_{I,j})/A_I(p_I), \quad (35)$$

$$y_{1,j}=(p_M-l_{M,j})-(p_I-l_{I,1,j}), \quad (36)$$

$$p_M-p_I=G_l(y_{1,1},y_{l,2},y_{1,V}), \quad (37)$$

where $G_1$ is a suitable function of V variables.

Where both early side and late side correlation amplitudes are used in the FAVT mode, two early side sequences, $\{A_M(e_{M,i})\}$ and $\{A_I(e_{I,i})\}$, and two late side sequences, $\{A_M(l_{M,i})\}$ and $\{A_I(l_{I,i})\}$, are chosen with the constraints $$r_{M,e,i}=A_M(e_{M,i})/A_M(p_M)(i=1,\ldots,U) \quad (38)$$

$$r_{I,e,i}=A_I(e_{I,i})/A_I(p_I), \quad (39)$$

$$r_{M,l,j}=A_M(l_{M,1})/A_M(p_M)(j=1,\ldots,V;U+V \geq 2), \quad (40)$$

$$r_{I,1,j}=A_I(l_{I,1})/A_I(p_I), \quad (41)$$

$$y_{e,i}=(p_M-e_{M,e,i})-(p_I-e_{I,e,i}), \quad (42)$$

$$y_{1,j}=(p_M-l_{M,j})-(p_I-l_{I,1,j}), \quad (43)$$

and the difference between the punctual code phase shifts for the measured and idealized correlation functions is expressed as $$p_M-p_I=G(y_{e,1},\ldots,y_{e,U},y_{1,1},\ldots,y_{1,V}), \quad (44)$$

where G is a suitable function of U+V variables.

In another embodiment, correlation amplitude gradients or slopes are used to determine the difference $p_M-p_I$. In a first version in the FTVA mode, two early side sequences, $\{e_{M,i}\}$ and $\{e_{I,i}\}$, are chosen that satisfy the relations $$p_M-e_{M,i}=\Delta_{M,e,i}(i=1,\ldots,U;U \geq 1), \quad (45)$$

$$p_I-e_{I,i}=\Delta_{I,e,i}, \quad (46)$$

where the quantities $\Delta_{M,e,i}$ and $\Delta_{I,e,i}$ are selected (positive) values. Correlation gradient or slope values and differences thereof $$B_{M,e,i}=(A_M(p_M)-A_M(e_{M,i}))/(p_M-e_{M,i}), \quad (47)$$

$$B_{I,e,i}=(A_I(p_I)-A_I(e_{I,i}))/(p_I-e_{I,i}), \quad (48)$$

$$z_{e,i}=B_{M,e,i}-B_{I,e,i}, \quad (49)$$

are formed, and the difference between the punctual code phase shifts for the measured and idealized correlation functions is expressed as $$p_M-p_I=H_e(z_{e,1},\ldots,z_{e,U}), \quad (50)$$

where $H_e$ is a suitable function of U variables.

In an analogous late side version in the FTVA mode, two late side sequences, $\{l_{M,j}\}$ and $\{l_{I,j}\}$, are chosen, and Eqs. (45), (46), (47), (48), (49) and (50) are replaced by the relations $$p_M-l_{M,j}=\Delta_{M,l,j}(j=1,\ldots,V;V \geq 1), \quad (51)$$

$$p_I-l_{I,j}=\Delta_{I,l,j}, \quad (52)$$

$$B_{M,l,j}=\{A_M(p_M)-A_M(l_{M,j})\}/(p_M-l_{M,j}), \quad (53)$$

$$B_{I,l,j}=\{A_I(p_I)-A_I(l_{I,j})\}/(p_I-l_{I,j}), \quad (54)$$

$$z_{l,j}=B_{M,l,j}-B_{I,l,j}, \quad (55)$$

$$p_M-p_I=H_l(z_{l,1},\ldots,z_{l,V}), \quad (56)$$

where the quantities $\Delta_{M,l,i}$ and $\Delta_{I,l,i}$ are selected (negative) values and $H_e$ is a suitable function of V variables.

Where both early side and late side correlation values are used in the FTVA mode, two early side sequences, $\{e_{M,i}\}$ and $\{e_{I,i}\}$, and two late side sequences, $\{l_{M,j}\}$ and $\{l_{I,j}\}$, are chosen that satisfy the requirements $$p_M-e_{M,i}=\Delta_{M,e,i}(i=1,\ldots,U), \quad (57)$$

$$p_I-e_{I,i}=\Delta_{I,e,i}, \quad (58)$$

$$p_M-e_{M,j}=\Delta_{M,e,j}(i=j,\ldots,V;U+V \geq 2), \quad (59)$$

$$p_I-e_{I,j}=\Delta_{I,j,i}, \quad (60)$$

where the quantities $\Delta_{M,e,i}, \Delta_{I,e,i}, \Delta_{M,e,i}$ and $\Delta_{I,e,i}$ are selected values.

The difference between the punctual code phase shifts for the measured and idealized correlation functions is expressed as $$p_M-p_I=H(z_{e,1},\ldots,z_{e,U},z_{l,1},\ldots,z_{l,V}), \quad (61)$$

where H is a suitable function of U+V variables.

In a first version using correlation function gradients in the FTVA mode, two early side sequences, $\{e_{M,i}\}$ and $\{e_{I,i}\}$, are chosen for which the corresponding code phase shift differences $$\Delta_{M,e,i}=p_M-e_{M,i}(i=1,\ldots,U;U \geq 1) \quad (62)$$

$$\Delta_{I,l,i}=p_I-l_{I,i}, \quad (63)$$

are selected (positive) values. Correlation gradient or slope values and differences are formed as in Eqs. (47) and (48), and the difference between the punctual code phase shifts for the measured and idealized correlation functions is expressed as $$p_M-p_I=K_e(z_{e,1},\ldots,z_{e,U}), \quad (64)$$

where $K_e$ is a suitable function of U variables.

In a second version using correlation gradients in the FTVA mode, two late side sequences, $\{l_{M,j}\}$ and $\{l_{I,j}\}$, are chosen, and Eqs. (62), (63) and (64) are replaced by the relations $$\Delta_{M,l,j}=p_M-l_{M,j}(j=1,\ldots,V;V \geq 1) \quad (65)$$

$$\Delta_{I,l,j}=p_I-l_{I,j}, \quad (66)$$

$$p_M - p_I = K_1(z_{1,1}, \ldots, z_{l,V}), \tag{67}$$

where $K_1$ is a suitable function of V variables.

In a third version using correlation gradients in the FTVA mode, two early side sequences, $\{e_{M,j}\}$ and $\{e_{I,j}\}$, and two late side sequences, $\{l_{M,j}\}$ and $\{l_{I,j}\}$, are chosen that satisfy Eqs. (62), (63), (65) and (66), respectively, and the analog of Eq. (64) or (67) becomes $$p_M - p_I = K(z_{e,1}, \ldots, z_{e,U}; z_{1,1}, \ldots, z_{l,V}), \tag{68}$$

where K is a suitable function of U+V variables (U+V≥2).

In a first version using correlation gradients in the FAVT mode, two early side sequences, $\{e_{M,i}\}$ and $\{e_{I,i}\}$, are chosen for which the corresponding amplitude ratios $$r_{M,e,i} = A_M(e_{M,i})/A_M(p_M)(i=1, \ldots, U; U \geq 1), \tag{69}$$

$$r_{I,e,i} = A_I(e_{I,i})/A_I(p_I), \tag{70}$$

are selected (positive) values. Correlation gradient or slope values and differences are formed as in Eqs. (47) and (48), and the difference between the punctual code phase shifts for the measured and idealized correlation functions is expressed as $$p_M - p_I = K_e(z_{e,1}, \ldots, z_{e,U}), \tag{71}$$

where $K_e$ is a suitable function of U variables.

In a second version using correlation gradients in the FAVT mode, two late side sequences, $\{l_{M,j}\}$ and $\{l_{I,j}\}$, are chosen for which the corresponding amplitude ratios $$r_{M,l,i} = A_M(l_{M,i})/A_M(p_M), (j=1, \ldots, V; V \geq 1) \tag{72}$$

$$r_{I,l,i} = A_I(l_{I,i})/A_I(p_I), \tag{73}$$

are selected (positive) values. Correlation gradient or slope values and differences are formed as in Eqs. (47) and (48), and the difference between the punctual code phase shifts for the measured and idealized correlation functions is expressed as $$p_M - p_I = H_e(z_{1,1}, \ldots, z_{l,U}), \tag{74}$$

where $K_e$ is a suitable function of V variables.

In a third version using correlation gradients in the FAVT mode, two early side sequences, $\{e_{M,j}\}$ and $\{e_{I,j}\}$, and two late side sequences, $\{l_{M,j}\}$ and $\{l^{I,j}\}$, are chosen that satisfy Eqs. (69), (70), (71) and (72), respectively. Correlation gradient or slope values and differences are formed as in Eqs. (47) and (48) and the analog of Eq. (71) or (74) becomes $$p_M - p_I = K(z_{e,1}, \ldots, z_{e,U}; z_{1,1}, \ldots, z_{l,V}), \tag{75}$$

where K is a suitable function of U+V variables (U+V≥2).

Figure 5A:
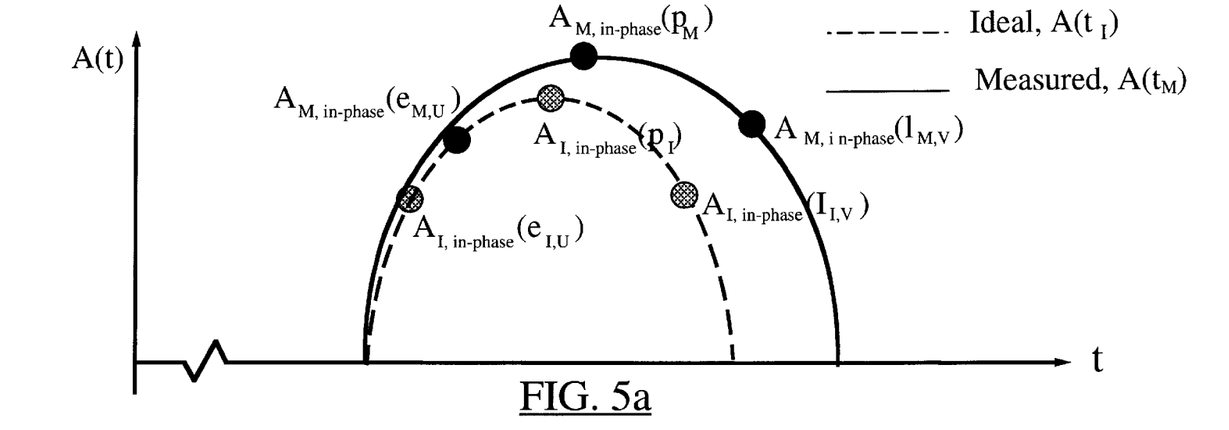
FIGS. 5A and 5B are graphical views illustrating the in-phase and quadrature correlation embodiment.
Figure 5B:
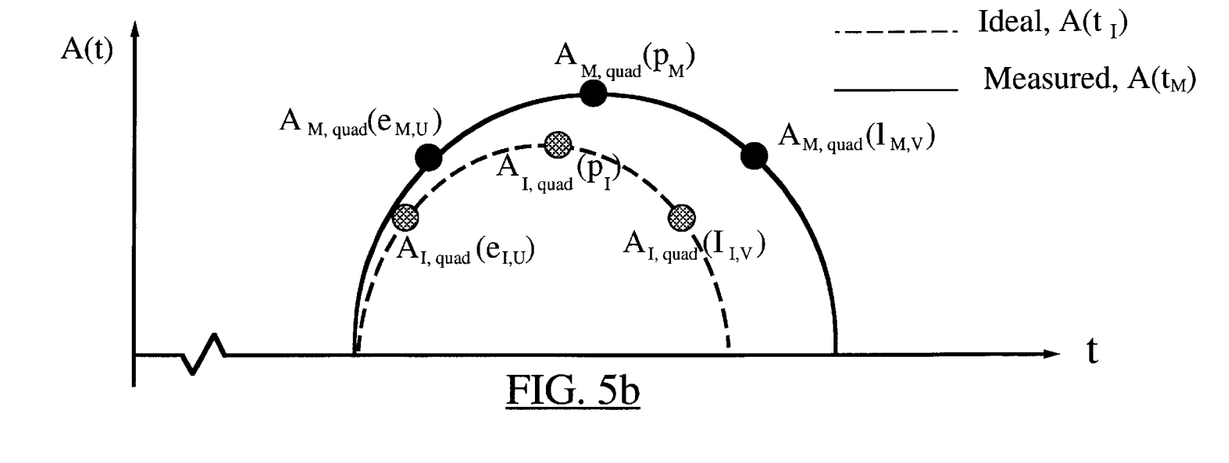

The correlation amplitudes $A_M(t)$ and $A_I(t)$ used above can be formed in a conventional manner as indicated in Eqs. (1) and (2). Alternatively, the reference signal $S_{ref}(t)$ and the composite signal $S_{comp}(t)$ can be split into in-phase components $S_{ref,in-phase}(t)$ and $S_{comp,in-phase}(t)$ and quadrature components $S_{ref,quad}(t)$ and $S_{comp,quad}(t)$, as discussed by W. Tomasi in *Electronic Communications Systems*, Prentice Hall, New York, 1988, pp. 502–510. Correlation functions $A_{M,in-phase}(t)$, $A_{M,quad}(t)$, $A_{I,in-phase}(t)$ and $A_{I,quad}(t)$ are determined for these four components and are shown in FIGS. 5A and 5B. First and second combined correlation functions, defined by $$A_M(t) = [(A_{M,in-phase}(t))^2 + (A_{M,quad}(t))^2]^{1/2}, \tag{76}$$

$$A_I(t) = [(A_{I,in-phase}(t))^2 + (A_{I,quad}(t))^2]^{1/2}, \tag{77}$$

are formed and used in place of the conventional correlation amplitudes $A_M(t)$ and $A_I(t)$ in any of the embodiments discussed above. This approach does not require that the carrier phase be locked at the receiver and thus is potentially more useful in determining the punctual code phase shift difference $p_M - p_I$ for the measured and idealized correlation functions.

I claim:

1. A method of synchronizing to a reference signal the timing of a received composite, code phase SATPS signal, the composite signal consisting of a preferred, interference-free signal distorted by at least one interfering signal, to determine an undistorted timing point of the preferred signal, the method comprising the steps of:

(1) generating a first correlation function $A_I(t)$ representing a timing relationship between a selected reference signal and the reference signal, where the reference signal is a digital signal with a timing cycle of selected length, and where $A_I(t)$ has a peak amplitude at an unknown code phase shift value $t = p_I$;

(2) receiving a composite code phase SATPS signal consisting of a preferred, interference-free signal distorted by at least one interfering signal;

(3) generating a second correlation function $A_M(t)$ representing a timing relationship between the composite signal and the reference signal;

(4) determining a nominal peak amplitude $A_M(p_M)$ and the corresponding code phase shift value $t = p_M$ of the second correlation function;

(5) determining a sequence of U early code phase shift values $e_{I,i} < p_I (i=1, \ldots, U; U \geq 2)$ for the first correlation function $A_I(t)$ for which the code phase shift differences $p_I - e_{I,i} = \Delta_{I,e,i}$ have selected values;

(6) determining a sequence of U early code phase shift values $e_{M,i} < p_M (i=1, \ldots, U)$ for the second correlation function $A_M(t)$ for which the code phase shift differences $p_M - e_{M,i} = \Delta_{M,e,i}$ have selected values;

(7) forming a sequence of U functions of correlation amplitude ratios defined by the relations $x_{e,i} = G_{e,i}(A_M(e_{M,i})/A_M(p_M)) - G_{e,i}(A_I(e_{I,i})/A_I(p_I))$ for $i = 1, \ldots, U$, where $G_{e,i}(y)$ is a selected function of a variable y;

(8) determining a difference in punctual code phase shift between the first and second correlation functions by a relation $$p_M - p_I = F_e(x_{e,1}, x_{e,2}, \ldots, x_{e,U}),$$

where $F_e$ is a selected function of at least one of the variables $x_{e,i}(i=1, \ldots, U)$; and (9) subtracting the difference $p_M - p_I$ from an apparent time of arrival of the composite code phase SATPS signal to determine a modified time of arrival of the composite signal.

2. The method of claim 1, wherein the steps (1), (2), (3) and (4) comprise the steps of:

receiving a selected reference signal $S_{ref}(t)$ and generating an in-phase reference signal component $S_{ref,in-phase}(t)$ and a quadrature reference signal component $S_{ref,quad}(t)$ from this reference signal, where the reference signal is a digital signal with a timing cycle of selected length, and where $A_I(t)$ has a peak amplitude at an unknown code phase shift value $t = p_I$;

receiving a composite signal $S_{comp}(t)$, consisting of a preferred, interference-free signal distorted by at least one interfering signal, and generating an in-phase reference signal component $S_{comp,in-phase}(t)$ and a quadrature reference signal component $S_{comp,quad}(t)$ from this composite signal;

generating a first correlation function $A_{I,in-phase}(t)$ representing a timing relationship between the signal $S_{ref,in-phase}(t)$ and the signal $S_{comp,in-phase}(t)$;

generating a second correlation function $A_{M,in-phase}(t)$ representing a timing relationship between the signal $S_{ref,in-phase}(t)$ and the signal $S_{comp,in-phase}(t)$;

generating a third correlation function $A_{I,quad}(t)$ representing a timing relationship between the signal $S_{ref,quad}(t)$ and the signal $S_{comp,quad}(t)$;

generating a fourth correlation function $A_{M,quad}(t)$ representing a timing relationship between the signal $S_{ref,quad}(t)$ and the signal $S_{comp,quad}(t)$;

generating a first combined correlation function $$A_I(t) = [(A_{I,in-phase}(t))^2 + (A_{I,quad}(t))^2]^{1/2};$$

generating a second combined correlation function $$A_M(t) = [(A_{M,in-phase}(t))^2 + (A_{M,quad}(t))^2]^{1/2};$$

determining a nominal peak amplitude $A_I(p_I)$ and the corresponding code phase shift value $t=p_I$ of the first combined correlation function; and determining a nominal peak amplitude $A_M(p_M)$ and the corresponding code phase shift value $t=p_M$ of the second combined correlation function.

3. The method of claim 1, further comprising the step of selecting at least one of said functions $G_{e,i}(y)$ to be proportional to a kth power of said variable y, where k is a selected real number $\geq 1$.

4. The method of claim 1, further comprising the step of selecting at least one of said functions $G_{e,i}(y)$ to be proportional to a kth power of said variable y, where k is a selected real number <1.

5. A method of synchronizing to a reference signal the timing of a received composite, code phase SATPS signal, the composite signal consisting of a preferred, interference-free signal distorted by at least one interfering signal, to determine an undistorted timing point of the preferred signal, the method comprising the steps of:

(1) generating a first correlation function $A_I(t)$ representing a timing relationship between a selected reference signal and the reference signal, where the reference signal is a digital signal with a timing cycle of selected length, and where $A_I(t)$ has a peak amplitude at an unknown code phase shift value $t=p_I$;

(2) receiving a composite signal consisting of a preferred, interference-free signal distorted by at least one interfering signal;

(3) generating a second correlation function $A_M(t)$ representing a timing relationship between the composite signal and the reference signal;

(4) determining a nominal peak amplitude $A_M(p_M)$ and the corresponding code phase shift value $t=p_M$ of the second correlation function;

(5) determining a sequence of V late code phase shift values $l_{I,j} > p_I$ ($j=1, \ldots, V; V \geq 2$) for the first correlation function $A_I(t)$ for which the code phase shift differences $p_I - l_{I,j} = \Delta_{I,I,j}$ have selected values;

(6) determining a sequence of V late code phase shift values $l_{M,j} > p_M$ ($j=1, \ldots, V$) for the second correlation function $A_M(t)$ for which the code phase shift differences $p_M - l_{M,j} = \Delta_{M,I,j}$ have selected values;

(7) forming a sequence of V functions of correlation amplitude ratios defined by the relations $x_{I,j} = H_{I,j}(A_M(l_{M,j})/A_M(p_M)) - H_{I,j}(A_I(l_{I,j})/A_I(p_I))$ for $j=1, \ldots, V$, where $H_{I,i}(z)$ is a selected function of a variable z;

(8) determining a difference in punctual code phase shift between the first and second correlation functions by a relation $$p_M - p_I = F_I(x_{I,1}, x_{I,2}, \ldots, x_{I,V}),$$

where $F_I$ is a selected function of at least one of the variables $x_{I,j}$ ($j=1, \ldots, V$); and (9) subtracting the difference $p_M - p_I$ from an apparent time of arrival of the composite code phase SATPS signal determine a modified time of arrival of the composite signal.

6. The method of claim 5, wherein the steps (1), (2), (3) and (4) comprise the steps of:

receiving a selected reference signal $S_{ref}(t)$ and generating an in-phase reference signal component $S_{ref,in-phase}(t)$ and a quadrature reference signal component $S_{ref,quad}(t)$ from this reference signal, where the reference signal is a digital signal with a timing cycle of selected length, and where $A_I(t)$ has a peak amplitude at an unknown code phase shift value $t=p_I$;

receiving a composite signal $S_{comp}(t)$, consisting of a preferred, interference-free signal distorted by at least one interfering signal, and generating an in-phase reference signal component $S_{comp,in-phase}(t)$ and a quadrature reference signal component $S_{comp,quad}(t)$ from this composite signal;

generating a first correlation function $A_{I,in-phase}(t)$ representing a timing relationship between the signal $S_{ref,in-phase}(t)$ and the signal $S_{comp,in-phase}(t)$;

generating a second correlation function $A_{M,in-phase}(t)$ representing a timing relationship between the signal $S_{ref,in-phase}(t)$ and the signal $S_{comp,in-phase}(t)$;

generating a third correlation function $A_{I,quad}(t)$ representing a timing relationship between the signal $S_{ref,quad}(t)$ and the signal $S_{comp,quad}(t)$;

generating a fourth correlation function $A_{M,quad}(t)$ representing a timing relationship between the signal $S_{ref,quad}(t)$ and the signal $S_{comp,quad}(t)$;

generating a first combined correlation function $$A_I(t) = \{(A_{I,in-phase}(t))^2 + (A_{I,quad}(t))^2\}^{1/2};$$

generating a second combined correlation function $$A_M(t) = \{(A_{M,in-phase}(t))^2 + (A_{M,quad}(t))^2\}^{1/2};$$

determining a nominal peak amplitude $A_I(p_I)$ and the corresponding code phase shift value $t=p_I$ of the first combined correlation function; and determining a nominal peak amplitude $A_M(p_M)$ and the corresponding code phase shift value $t=p_M$ of the second combined correlation function.

7. The method of claim 5, further comprising the step of selecting at least one of said functions $H_{I,i}(y)$ to be proportional to a kth power of said variable y, where k is a selected real number $\geq 1$.

8. The method of claim 5, further comprising the step of selecting at least one of said functions $H_{I,i}(y)$ to be proportional to a kth power of said variable y, where k is a selected real number <1.

9. A method of synchronizing to a reference signal the timing of a received composite, code phase SATPS signal, the composite signal consisting of a preferred, interference-free signal distorted by at least one interfering signal, to determine an undistorted timing point of the preferred signal, the method comprising the steps of:

(1) generating a first correlation function $A_I(t)$ representing a timing relationship between a selected reference signal and the reference signal, where the reference signal is a digital signal with a timing cycle of selected length, and where $A_I(t)$ has a peak amplitude at an unknown code phase shift value $t=p_I$;

(2) receiving a composite signal consisting of a preferred, interference-free signal distorted by at least one interfering signal;

(3) generating a second correlation function $A_M(t)$ representing a timing relationship between the composite signal and the reference signal;

(4) determining a nominal peak amplitude $A_M(p_M)$ and the corresponding code phase shift value $t=p_M$ of the second correlation function;

(5) determining a sequence of U early code phase shift values $e_{I,i} < p_I$ ($i=1, \ldots, U; U \geq 1$) for the first correlation function $A_I(t)$ for which the code phase shift differences $p_I - e_{I,i} = \Delta_{I,e,i}$ have selected values;

(6) determining a sequence of U early code phase shift values $e_{M,i} < p_M$ ($i=1, \ldots, U$) for the second correlation function $A_M(t)$ for which the code phase shift differences $p_M - e_{M,i} = \Delta_{M,e,i}$ have selected values;

(7) determining a sequence of V late code phase shift values $l_{I,j} > p_I$ ($j=1, \ldots, V; U+V \geq 2$) for the first correlation function $A_I(t)$ for which the code phase shift differences $p_I - l_{I,j} = \Delta_{I,l,j}$ have selected values;

(8) determining a sequence of V late code phase shift values $l_{M,j} > p_M$ ($j=1, \ldots, V$) for the second correlation function $A_M(t)$ for which the code phase shift differences $p_M - l_{M,j} = \Delta_{M,l,j}$ have selected values;

(9) forming a sequence of L correlation amplitude ratios defined by the relations $x_{e,i} = G_{e,i}(A_M(e_{M,i})/A_M(p_M)) - G_{e,i}(A_I(e_{I,i})/A_I(p_I))$ for $i=1, \ldots, U$, where $G_{e,i}(y)$ is a selected function of a variable y for $i=1, \ldots, U$;

(10) forming a sequence of V correlation amplitude ratios defined by the relations $x_{l,j} = H_{l,j}(A_M(l_{M,j})/A_M(p_M)) - H_{l,j}(A_I(l_{I,j})/A_I(p_I))$ for $j=1, \ldots, V$, where $H_{l,j}(z)$ is a selected function of a variable z;

(11) determining a difference in punctual code phase shift between the first and second correlation functions by the relation $$p_M - p_I = F(x_{e,1}, \ldots, x_{e,U}, x_{l,1}, \ldots, x_{l,V}),$$

where F is a selected function of at least one of the variables $x_{e,i}$ ($i=1, \ldots, U$) and of at least one of the variables $x_{l,j}$ ($j=1, \ldots, V$); and (12) subtracting the difference $p_M - p_I$ from an apparent time of arrival of the composite code phase SATPS signal to determine a modified time of arrival of the composite signal.

10. The method of claim 9, wherein the steps (1), (2), (3) and (4) comprise the steps of:

receiving a selected reference signal $S_{ref}(t)$ and generating an in-phase reference signal component $S_{ref,in\text{-}phase}(t)$ and a quadrature reference signal component $S_{ref,quad}(t)$ from this reference signal, where the reference signal is a digital signal with a timing cycle of selected length, and where $A_I(t)$ has a peak amplitude at an unknown code phase shift value $t=p_I$;

receiving a composite signal $S_{comp}(t)$, consisting of a preferred, interference-free signal distorted by at least one interfering signal, and generating an in-phase reference signal component $S_{comp,in\text{-}phase}(t)$ and a quadrature reference signal component $S_{comp,quad}(t)$ from this composite signal;

generating a first correlation function $A_{I,in\text{-}phase}(t)$ representing a timing relationship between the signal $S_{ref,in\text{-}phase}(t)$ and the signal $S_{comp,in\text{-}phase}(t)$;

generating a second correlation function $A_{M,in\text{-}phase}(t)$ representing a timing relationship between the signal $S_{ref,in\text{-}phase}(t)$ and the signal $S_{comp,in\text{-}phase}(t)$;

generating a third correlation function $A_{I,quad}(t)$ representing a timing relationship between the signal $S_{ref,quad}(t)$ and the signal $S_{comp,quad}(t)$;

generating a fourth correlation function $A_{M,quad}(t)$ representing a timing relationship between the signal $S_{ref,quad}(t)$ and the signal $S_{comp,quad}(t)$;

generating a first combined correlation function $$A_I(t) = \{(A_{I,in\text{-}phase}(t))^2 + (A_{I,quad}(t))^2\}^{1/2};$$

generating a second combined correlation function $$A_M(t) = \{(A_{M,in\text{-}phase}(t))^2 + (A_{M,quad}(t))^2\}^{1/2};$$

determining a nominal peak amplitude $A_I(p_I)$ and the corresponding code phase shift value $t=p_I$ of the first combined correlation function; and determining a nominal peak amplitude $A_M(p_M)$ and the corresponding code phase shift value $t=p_M$ of the second combined correlation function.

11. The method of claim 9, further comprising the step of selecting at least one of said functions $G_{e,i}(y)$ or at least of said functions $H_{l,j}(z)$ to be proportional to a kth power of said variable y, where k is a selected real number $\geq 1$.

12. The method of claim 9, further comprising the step of selecting at least one of said functions $G_{e,i}(y)$ or at least of said functions $H_{l,j}(z)$ to be proportional to a kth power of said variable y, where k is a selected real number $<1$.

* * * * *